(12) United States Patent
Wolnek

(10) Patent No.: US 6,375,120 B1
(45) Date of Patent: Apr. 23, 2002

(54) METHOD AND APPARATUS FOR BUILDING A METAL/COMPOSITE HYBRID AIRPLANE COMPONENT

(76) Inventor: Jason M. Wolnek, 127 Kayaderosseras Dr., Ballston Spa, NY (US) 12020

( * ) Notice: Subject to any disclaimer, the term of this patent is extended or adjusted under 35 U.S.C. 154(b) by 0 days.

(21) Appl. No.: 09/521,910

(22) Filed: Mar. 9, 2000

Related U.S. Application Data

(63) Continuation-in-part of application No. 08/892,867, filed on Jul. 14, 1997, now abandoned.

(51) Int. Cl.[7] .................................................. B64C 1/00
(52) U.S. Cl. ........................ 244/123; 244/119; 244/132; 244/133
(58) Field of Search ................................ 244/123, 119, 244/132, 133, 117 R

(56) References Cited

U.S. PATENT DOCUMENTS

| 982,078 A | 1/1911 | Link ............................. 85/37 |
| 2,393,564 A | 1/1946 | Poupitch ........................ 85/37 |
| 2,957,196 A | 10/1960 | Kreider et al. ................... 16/2 |
| 3,130,629 A | 4/1964 | Church ............................ 85/40 |
| 3,655,424 A | 4/1972 | Orowan ....................... 117/68.5 |
| 3,733,958 A | 5/1973 | Willey ............................. 85/37 |
| 4,010,519 A | 3/1977 | Worthing ....................... 24/141 |
| 4,512,699 A | 4/1985 | Jackson et al. .............. 411/368 |
| 4,557,100 A | 12/1985 | Gorges ........................... 52/787 |
| 4,630,168 A | 12/1986 | Hunt ............................. 361/218 |
| 4,760,493 A | 7/1988 | Pearson ....................... 361/218 |
| 4,817,264 A | 4/1989 | Worthing ....................... 29/512 |
| 4,839,771 A | 6/1989 | Covey .......................... 361/218 |
| 4,865,792 A | 9/1989 | Moyer .......................... 264/249 |
| 4,902,215 A | 2/1990 | Seemann, III ............... 425/406 |
| 4,907,733 A | 3/1990 | Pratt et al. .................. 228/122 |
| 4,962,904 A | 10/1990 | Perry et al. .................. 244/131 |
| 5,271,879 A | 12/1993 | Saatchi et al. ............. 264/46.5 |
| 5,297,760 A | 3/1994 | Hart-Smith ................. 244/132 |
| 5,359,765 A | 11/1994 | Auriol et al. .............. 29/525.2 |
| 5,580,502 A | 12/1996 | Forster et al. ............. 264/46.5 |
| 5,580,514 A | 12/1996 | Farley ......................... 264/516 |
| 5,806,796 A | 9/1998 | Healey ................... 244/117 R |

*Primary Examiner*—J. Woodrow Eldred
(74) *Attorney, Agent, or Firm*—Heslin Rothenberg Farley & Mesiti P.C.; Wayne F. Reinke, Esq.

(57) ABSTRACT

A metal airplane component frame is fastened to a skin of composite material by a countersunk, beveled-head rivet extended through aligned openings in the metal layer and in a high load bearing strength material inlay embedded in the composite material skin. The beveled head of the rivet lies within the skin.

42 Claims, 3 Drawing Sheets

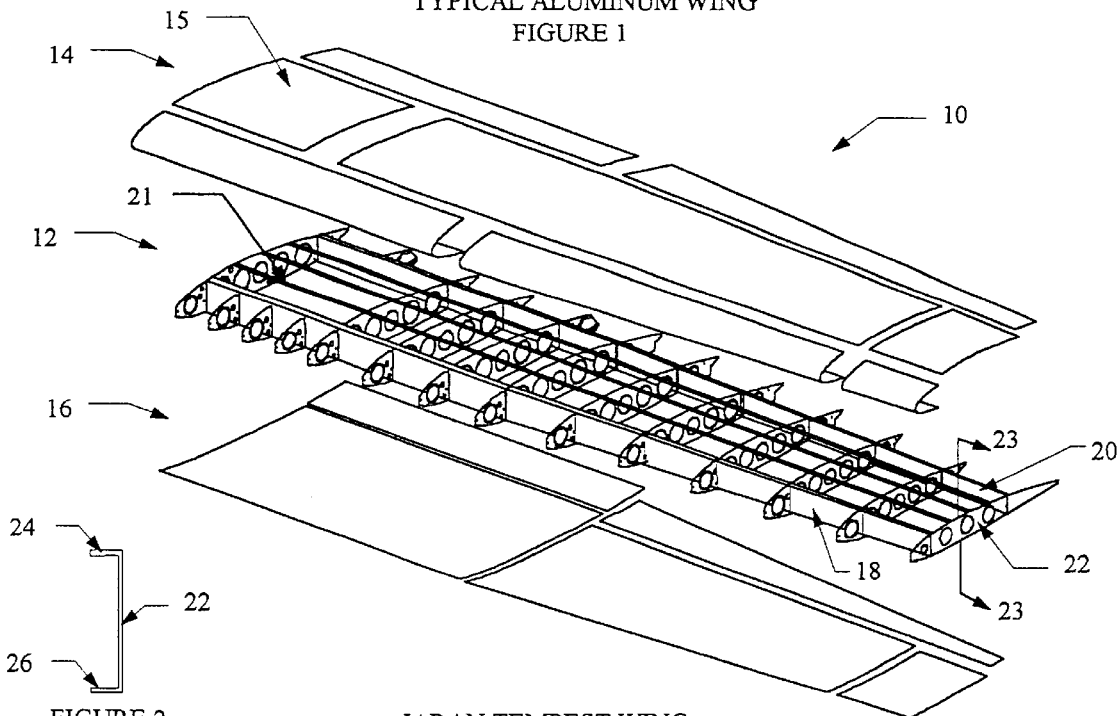
TYPICAL ALUMINUM WING
FIGURE 1
FIGURE 2
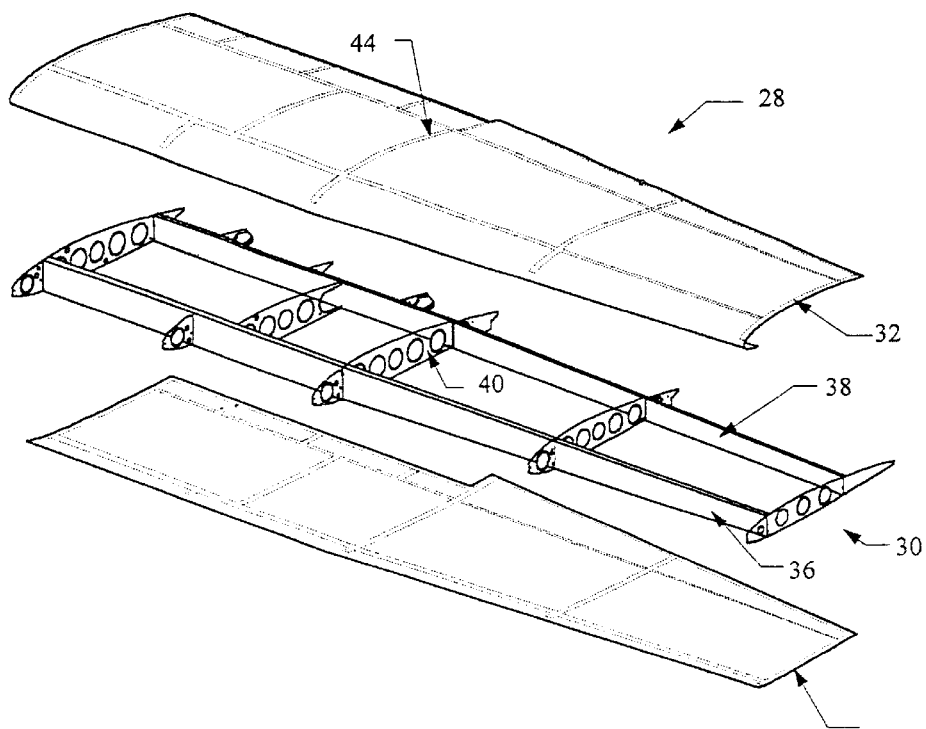
JARAN TEMPEST WING
FIGURE 3

PREFERRED DESIGN

ALTERNATE DESIGN

ALTERNATE DESIGN

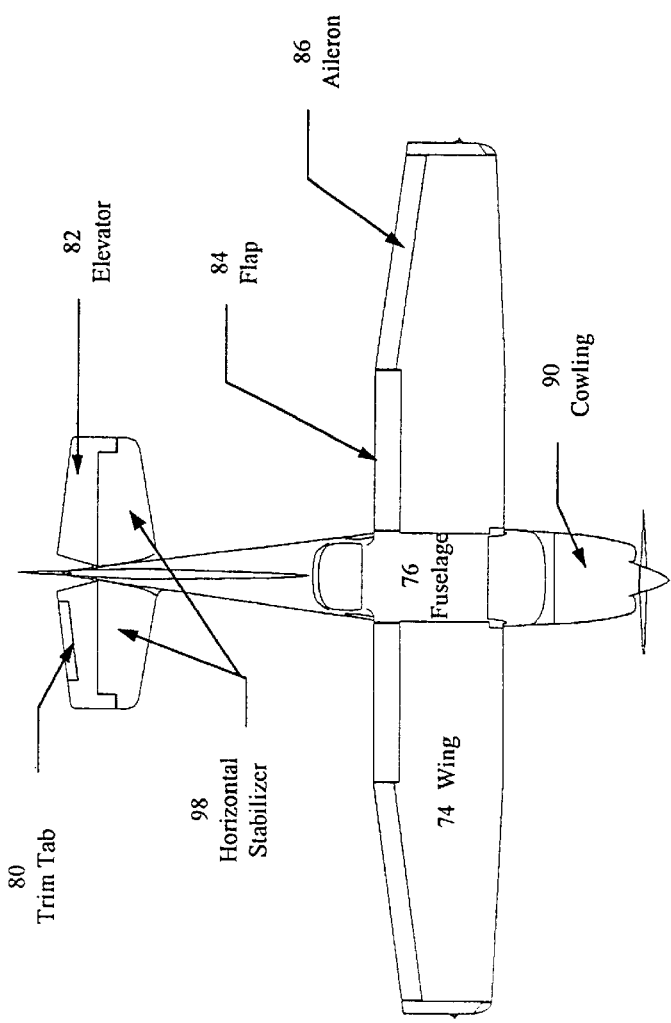
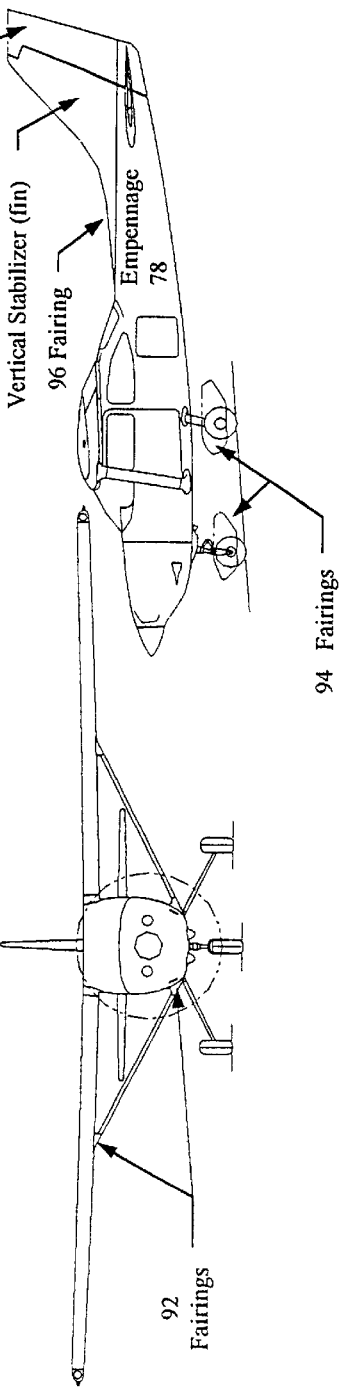
FIGURE 7
FIGURE 8
FIGURE 9

METHOD AND APPARATUS FOR BUILDING A METAL/COMPOSITE HYBRID AIRPLANE COMPONENT

BACKGROUND OF THE INVENTION

This application is a continuation-in-part of U.S. patent application Ser. No. 08/892,867, filed on Jul. 14, 1997 abandoned.

TECHNICAL FIELD

The present invention generally relates to airplane components. More particularly, the present invention relates to a method and apparatus for building airplane components with a combination of metal and composite materials.

BACKGROUND INFORMATION

In the past, it has been difficult to securely fasten metal and composite materials to create strong, light-weight articles for various purposes. Composite materials, such as fiberglass, generally do not handle bearing loads well, and tend to fail at stress levels unacceptable for traditional mechanical fasteners. In addition, composite materials generally cannot handle concentrated point loads normal to the surface. Compressive point loads tend to cause the composite material to either crush or "creep." The composite material tends to act like a quasi-fluid over time, similar to an extremely viscous fluid. A fastener applied under pressure, such as a pop-rivet or tightened screw or bolt, will cause the composite material to slowly flow out from under the head of the fastener. As a result of this creeping, the fastener eventually comes loose.

The problem of fastening metal to composite materials is evident in the aviation industry. While airplane designers often favor the use of composite materials over metal, due to their superior rigidity and lower weight, highly engineered composite parts are relatively expensive compared to their metal counterparts. Although there are existing hybrid airplanes and structures used in aviation, they include independent metal and composite structures that are fastened together at a few well-reinforced points to maintain the component positions. For example, existing hybrid airplanes commonly have all-metal wings bolted onto a steel tubular fuselage with a composite covering giving the fuselage an aerodynamic shape, but which does not handle the majority of structural loads. Thus, the steel skeleton and composite covering do not create a coherent structure.

The industry has recently been focused either on improving all-metal airplane designs, or employing all-composite material designs. While the all-composite material designs are theoretically superior to all-metal designs, the comparatively high cost has prevented the proliferation of such designs. Due to the metal/composite material fastening problem, the aviation industry has largely ignored the possibility of combining metal and composite materials to create a coherent structure. However, the combination in a coherent structure would yield a low-cost, much lower weight airplane with fewer parts than all-metal designs.

Thus, a need exists for a way to securely fasten metal and composite materials together cost effectively to produce a coherent hybrid structure.

SUMMARY OF THE INVENTION

Briefly, the present invention satisfies the need for a way to securely fasten metal and composite materials cost effectively by embedding in the composite material a high load bearing strength inlay, relative to the composite material, to transfer a structural load from a fastener coupled to the inlay and distribute it over a wide enough area to reduce or eliminate damage to the composite material from the applied load.

In accordance with the above, it is an object of the present invention to provide a way to securely fasten metal and composite materials to form a coherent structure.

It is another object of the present invention to provide a cost-effective way to securely fasten metal and composite materials to form a coherent structure.

The present invention provides, in a first aspect, an airplane component, comprising a metal frame and a skin of composite material fastened to the metal frame. The skin is adapted to transfer a structural load when applied thereto.

The present invention provides, in a second aspect, a method of building an airplane component, comprising adapting a composite material airplane skin to transfer a structural load when applied thereto, and fastening the adapted composite material airplane skin to a metal airplane frame.

These, and other objects, features and advantages of this invention will become apparent from the following detailed description of the various aspects of the invention taken in conjunction with the accompanying drawings.

BRIEF DESCRIPTION OF THE DRAWINGS

FIG. 1 depicts the various parts of a conventional all-metal wing of an airplane.

FIG. 2 is a cross-sectional view of a rib of the all-metal wing of FIG. 1.

FIG. 3 depicts the various parts of a combination composite material/metal wing of an airplane in accordance with the present invention.

FIG. 7 is a top view of an airplane in accordance with the present invention.

FIG. 8 is a front view of the airplane of FIG. 7.

FIG. 9 is a side view of the airplane of FIG. 7.

BEST MODE FOR CARRYING OUT THE INVENTION

Figure 4:
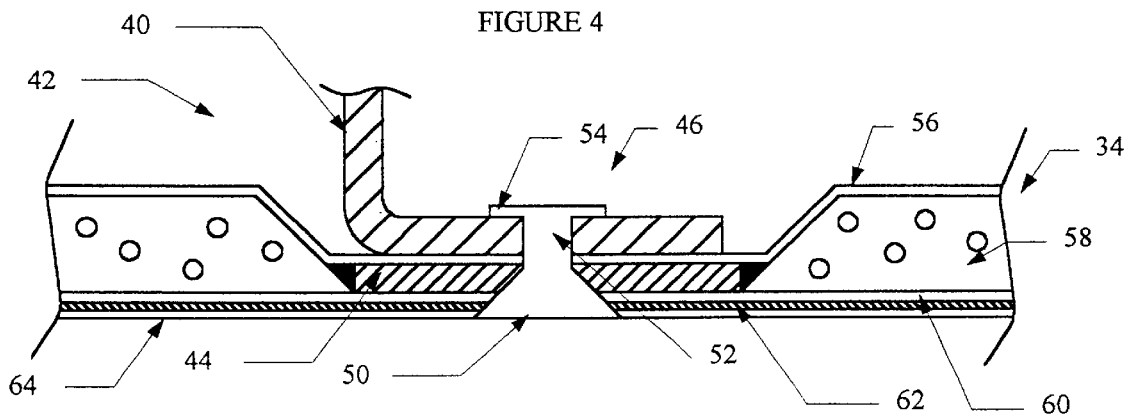
FIG. 4 is a cross-sectional view of a composite material/metal fastening area of the airplane wing of FIG. 3.

Although the present invention will be described with reference to airplane components, it will be understood that the invention is generally applicable wherever metal and composite materials are sought to be fastened together.

FIG. 1 depicts a conventional all-metal airplane wing 10, comprising inner metal frame 12 and outer covering layers or skins 14 and 16. Skins 14 and 16 comprise metal in sheet form. As used herein, the term "all-metal" refers to a structure with metal as the major structural constituent. However, it will be understood that some non-metal parts may be included, such as, for example, plastic or rubber. The skins of an airplane wing are typically made up of several sections of metal sheets, such as section 15. As one skilled in the art will know, inner metal frame 12 comprises spars 18 and 20 running approximately the length of wing 10, a number of stiffeners (e.g., stiffener 21) running parallel to the spars, and a series of ribs (e.g., rib 22) connecting the spars and supporting the stiffeners. As best shown in the FIG. 2 cross-sectional view of rib 22 taken along lines 23, each of the ribs includes flanges 24 and 26 for fastening the metal frame to the skins via any number of known fasteners.

In addition to the all-metal wing 10 depicted in FIG. 1, other wing structures are known comprised almost entirely of composite materials. However, complex and highly engineered composite parts are expensive relative to metal parts. Sheets of composite material are lighter and more rigid than sheets of metal. As used herein, the term "composite material" refers to a fiber-reinforced matrix material which may or may not surround a stiffening core material. In the present exemplary embodiment, the composite material comprises a combination of a fiber reinforced matrix material, polyurethane foam and metal. As used herein, the term "fiber reinforced matrix material" refers to one or more layers of a fibrous material embedded inside a cured matrix, such as, for example, resin. Examples of fiber include glass, carbon, "KEVLAR" which is commercially available from E.I. du Pont de Nemours & Co., ceramic, boron and paper. The fiber could be, for example, stitched, woven, unidirectional, biased, chopped, continuous strand or spun. Examples of a matrix material include any type of plastic resin that may or may not have a metallic or non-metallic filler (typically used to increase the resin viscosity or to enhance the dielectric or thermal properties of the resin), such as, for example, vinyl ester, epoxy, polyester, phenolic, bisalimide, urethane, cyanate and polyimide.

As used herein, the term "airplane component" refers to any portion of an airplane that could be built in accordance with the present invention. Examples of airplane components are shown in FIGS. 7–9 and include an airplane wing 74, a fuselage 76, empennage 78, an airplane control surface (e.g., control surfaces 80, 82, 84, 86 and 88) and a fairing (e.g., fairings 90, 92, 94 and 96). As one skilled in the art will know, an empennage is merely the rear section of an airplane, which comprises horizontal stabilizers 98 and vertical stabilizer or fin 100. As used herein, the term "control surface" refers to the moveable components on an airplane wing and tail. As one skilled in the art will know, a fairing is a surface of an airplane that shapes the airstream.

FIG. 3 depicts an airplane wing 28 made of metal and composite materials in accordance with the present invention. As can be appreciated from a visual comparison of FIGS. 1 and 3, wing 28 is a simpler design than wing 10, requiring fewer parts. The best of both metal and composite material technologies is blended together in the present invention, yielding a stronger and lighter airplane structure. This blend produces, at present, significant cost savings over all-metal planes, all-composite planes, and planes that utilize each material as a distinct structure (i.e., not a coherent structure as discussed above).

Wing 28 comprises inner metal frame 30 to which skins 32 and 34 are attached. Skins 32 and 34 are each preferably a continuous sheet of a fiber reinforced matrix material, whereas conventional metal skins 14 and 16 from FIG. 1 comprise several sections, yielding a greater possibility of structural integrity problems. Inner metal frame 30 comprises spars 36 and 38, running approximately the length of the wing, and ribs 40, which are attached to the spars in a conventional manner. However, notice that the number of ribs in frame 30 is substantially less than that of frame 12 in FIG. 1, and the stiffeners have been eliminated. The number of parts in the metal frame can be reduced, since skins 32 and 34 are composite materials, which are lighter and more rigid than sheets of metal.

FIG. 4 is a cross-sectional view of a fastening area 42 of wing 28 of FIG. 3, showing rib 40 fastened to lower skin 34. It will be understood that the structure of skin 32 is similar to the following description of skin 34. Embedded within skin 34 is inlay 44, which comprises a material, such as, for example, aluminum, magnesium or titanium, with a load bearing strength sufficiently greater than that of the other constituent parts of skin 34 to enable skin 34 to transfer a structural load to a fastener 46. In the present exemplary embodiment, fastener 46 comprises a countersunk beveled-head rivet. However, it will be understood that although such a countersunk, beveled-head rivet is preferred, fastener 46 could take on other forms, such as, for example, a screw or a bolt.

Inlay 44 can have various shapes, such as, for example, circular or square. Preferably, the size and shape of inlay 44 is optimized for the geometric constraints of the particular structure and use. Generally, the inlay material should be strong enough to accept potential loads that may be applied, such as a structural load. The inlay should also be large enough in area to effectively distribute those loads, and reduce or eliminate concentrated point loads on the skin surface adjacent thereto. The thickness of the inlay is determined by the type of fastener and the expected applied loads. Further, the inlay need not be completely solid, however, it should have a solid geometry in at least an area surrounding an opening therein for accepting a fastener. The size of the solid area will depend on the various constraints noted above.

As a further example of the various shapes inlay 44 can have, inlay 44 could take the form of a strip of material having a length commensurate with a length of the rib to which it will be fastened, and include one or more openings therein for accepting one or more fasteners. A strip of material implemented for one or more inlays would greatly simplify the process of aligning the same.

Rivet 46 comprises beveled head 50, stem 52 and peened section 54. As shown in FIG. 4, head 50 is shaped to fit within a correspondingly shaped opening of inlay 44 such that the inlay acts to stop rivet 46 from moving in a direction toward rib 40. Similarly, peened section 54 acts to prevent movement of rivet 46 in a direction away from rib 40. A countersunk beveled-head fastener is preferred, since it reduces or eliminates delamination of skin 34, as well as reducing or eliminating point loads on skin 34. As used herein, the term "delamination" refers to the different layers of the skin coming apart from one another. As indicated above, other fasteners could be used, but they may not provide these dual benefits. For example, a universal head fastener will reduce or eliminate delamination, but not point loads on the skin. As another example, a counterbored fastener will reduce or eliminate point loads on the skin, but not delamination.

Skin 34, except for any fastening areas, such as fastening area 42, comprises a lower ply 56 of a fiber reinforced matrix material, core 58, continuous upper ply 60 of a fiber reinforced matrix material (the same or different material from continuous lower ply 56), conductive layer 62 and outer veil 64. Core 58 comprises a light weight porous material, such as, for example, polyurethane foam. The purpose of core 58 is to thicken and thereby stiffen skin 34 without adding appreciable weight. In more technical terms, the core increases the skin's moment of inertia. Other examples of the core material include aluminum or aramid honeycomb, polyvinyl chloride (PVC), polymethacrylimide (PMI), and syntactic. In the fastening areas, such as fastening area 42, the core material is absent, since it would likely be crushed by the fastener. Conductive layer 62 is included for lightning protection, and may comprise, for example, expanded metal, such as an aluminum or copper mesh. Veil 64 is a thin layer of a fiber reinforced matrix material to protect conductive layer 62, and provide a smooth surface finish. It will be understood that skin 34 is specifically made and preferred for aviation uses, but that other constituent composite layers may be used with the present invention for this or other purposes.

Figure 5:
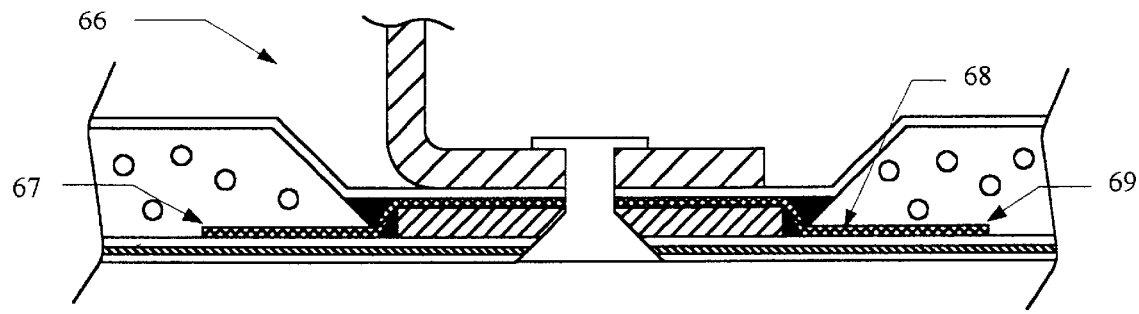
FIG. 5 is a variation of the fastening area of FIG. 4.

FIG. 5 shows an alternate fastening area 66. The difference between fastening area 42 in FIG. 4 and fastening area 66 is the presence of an extra reinforcement ply 68, spanning from end 67 to end 69 above the inlay, of a fiber reinforced matrix material. Layer 68 serves to strengthen the wing, handles delamination better than the FIG. 4 arrangement and provides extra shear strength at the edges of the inlay.

Figure 6:
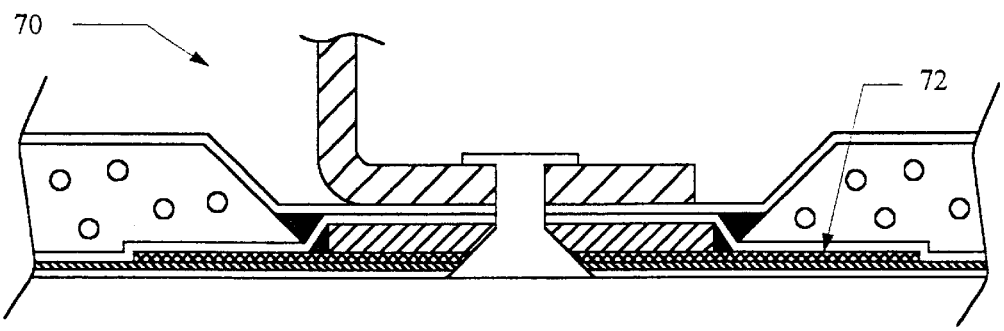
FIG. 6 is a variation of the fastening area of FIG. 5.

Similarly, FIG. 6 shows another alternate fastening area 70. The difference between fastening area 66 in FIG. 5 and fastening area 70 is the presence of a reinforcement ply 72 of a fiber reinforced matrix material on the outside of the inlay. Basically, the location of the top and reinforcement plys of FIG. 5 have been switched in the FIG. 6 embodiment. However, this switch ensures that the inlay always clamps down on both the upper and lower continuous plys (versus the lower continuous and noncontinuous reinforcement ply in FIG. 5).

For consideration of cost and processing, the embodiment of FIG. 4 is preferred, since there are fewer materials. However, ignoring these considerations, the FIG. 5 and FIG. 6 embodiments are preferred to the FIG. 4 embodiment, due to the added reinforcement ply. In addition, the FIG. 6 embodiment is preferred over the FIG. 5 embodiment, since it is better from a delamination standpoint. For example, if the top ply in FIG. 5 delaminates (i.e., pulls away) from the inlay, load transfer from the top ply to the fastener is adversely affected. In that situation, only the fastener head holds the top ply to the inlay. However, the FIG. 6 embodiment does not suffer this shortcoming.

Depending on such factors as the type, size and characteristics of the inlay, and the type and characteristics of the composite material, any number of processes can be used to embed the inlay within the composite material. As one example, if the inlay is aluminum and the composite material is fiberglass with a vinyl ester resin, the process disclosed in U.S. Pat. No. 4,902,215, issued to William H. Seemann, III on Feb. 20, 1990 (hereinafter, "the Seemann patent"), and which is herein incorporated by reference in its entirety, could be used. The Seemann patent discloses a resin transfer molding (RTM) process. As one skilled in the art will know, a RTM process involves preforming a part using dry fibers in a sealed mold, whereby liquid resin is introduced (e.g., by injection or using a vacuum) to impregnate the part. The resin chosen will depend on the temperature of the process, and the physical requirements therefor. The temperature at which the liquid resin is introduced depends in large part on the viscosity needed to impregnate the fibers. The part is cured after being impregnated and before being removed from the mold. The temperature of the cure depends on how closely matched the resin and inlay are with respect to their coefficients of heat expansion. For example, if the resin used experiences a slower expansion than the inlay, then a relatively lower temperature for liquid resin introduction is preferred.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. An airplane component, comprising:
a metal frame; and
a skin of composite material fastened to the metal frame, wherein the skin comprises an inlay embedded therein, wherein the inlay is solid in at least an area surrounding an opening therein for accepting a fastener, wherein the inlay has a load bearing strength sufficiently greater than that of the composite material to enable the skin to transfer a structural load through the inlay when applied thereto, and wherein the at least an area surrounding the opening is fully embedded in the skin.

2. The airplane component of claim 1, wherein the inlay comprises a metal.

3. The airplane component of claim 1, further comprising a fastener fastening the skin to the metal frame, wherein the fastener extends through an aligned opening in each of the metal frame, skin and inlay.

4. The airplane component of claim 3, wherein the fastener comprises one of a rivet, a screw and a bolt.

5. The airplane component of claim 3, wherein the fastener is shaped to reduce or eliminate delamination of the skin.

6. The airplane component of claim 5, wherein the fastener comprises a universal head fastener.

7. The airplane component of claim 3, wherein the fastener is shaped to reduce or eliminate point loads on the skin.

8. The airplane component of claim 7, wherein the fastener comprises a counterbored fastener.

9. The airplane component of claim 7, wherein the fastener is shaped to reduce or eliminate delamination of the skin, and wherein the fastener comprises a countersunk fastener with a beveled head.

10. The airplane component of claim 9, wherein the opening of the inlay is shaped to correspond to the beveled head.

11. The airplane component of claim 9, wherein the countersunk fastener comprises a stem peened against an outer surface of the metal frame.

12. The airplane component of claim 1, wherein the skin comprises an electrically conductive material.

13. The airplane component of claim 12, wherein the electrically conductive material comprises expanded metal.

14. The airplane component of claim 13, wherein the expanded metal comprises an aluminum mesh.

15. The airplane component of claim 13, wherein the expanded metal comprises a copper mesh.

16. The airplane component of claim 1, wherein the skin comprises at least two layers of a fiber reinforced matrix.

17. The airplane component of claim 16, wherein the skin further comprises a core between the at least two layers of the fiber reinforced matrix.

18. The airplane component of claim 17, wherein the inlay replaces a portion of the core.

19. The airplane component of claim 1, wherein the airplane component comprises an airplane wing.

20. The airplane component of claim 1, wherein the airplane component comprises an airplane fuselage.

21. The airplane component of claim 1, wherein the airplane component comprises an airplane empennage.

22. The airplane component of claim 21, wherein the airplane component comprises a horizontal airplane stabilizer.

23. The airplane component of claim 21, wherein the airplane component comprises a vertical airplane stabilizer.

24. The airplane component of claim 1, wherein the airplane component comprises an airplane control surface.

25. The airplane component of claim 1, wherein the airplane component comprises an airplane fairing.

26. The airplane component of claim 1, further comprising a fastener fastening the skin to the metal frame, wherein the fastener extends through an aligned opening in each of the metal frame, skin and inlay, and wherein the fastener engages the inlay such that when the structural load is applied to the skin, the structural load is transferred to the fastener via the inlay.

27. The airplane component of claim 26, wherein the fastener comprises a countersunk rivet with a beveled head, and wherein the opening of the inlay is shaped to correspond to the beveled head.

28. A method of building an airplane component, comprising steps of:
adapting a composite material airplane skin to transfer a structural load when applied thereto; and
fastening the adapted composite material airplane skin to a metal airplane frame with a fastener,
wherein the step of adapting comprises embedding an inlay within the composite material airplane skin, wherein the inlay is solid in at least an area surrounding an opening therein for accepting the fastener, wherein the inlay has a load bearing strength sufficiently greater than that of the composite material to enable the skin to transfer the structural load through the inlay when applied, and wherein the at least an area surrounding the opening is fully embedded in the skin.

29. The method of claim 28, wherein the composite material airplane skin comprises at least two layers of a fiber reinforced matrix, and wherein the step of embedding comprises embedding the inlay between the at least two layers of the fiber reinforced matrix.

30. The method of claim 29, wherein the composite material airplane skin further comprises a core between the at least two layers of the fiber reinforced matrix, and wherein the step of embedding the inlay comprises replacing a portion of the core with the inlay.

31. The method of claim 28, wherein the step of fastening comprises fastening so as to reduce or eliminate delamination of the composite material airplane skin.

32. The method of claim 31, wherein the step of fastening comprises inserting a fastener through an aligned opening in each of the composite material airplane skin, metal airplane frame and inlay.

33. The method of claim 28, wherein the step of fastening comprises fastening so as to reduce or eliminate point loads on the composite material airplane skin.

34. The method of claim 33, wherein the fastener comprises a rivet with a beveled head, wherein the step of inserting comprises inserting the rivet through the aligned opening in each of the composite material airplane skin, metal and inlay, and wherein the step of fastening further comprises a step of countersinking the rivet.

35. The method of claim 34, wherein the step of fastening further comprises a step of peening the rivet against a surface of the metal airplane frame.

36. The method of claim 28, wherein the composite material airplane skin comprises at least two layers of a fiber reinforced matrix material, the method further comprising a step of coupling a layer of electrically conductive material to at least one of the at least two layers of the fiber reinforced matrix material.

37. The method of claim 28, wherein the composite material airplane skin comprises at least two layers of a fiber reinforced matrix material, the method further comprising a step of sandwiching a core for stiffening the composite material airplane skin between the at least two layers of the fiber reinforced matrix material.

38. An airplane component, comprising:
a metal frame; and
a skin of composite material fastened to the metal frame, wherein the skin comprises an inlay embedded therein, wherein the inlay is solid in at least an area surrounding an opening therein for accepting a fastener, wherein the inlay has a load bearing strength sufficiently greater than that of the composite material to enable the skin to transfer a structural load between the metal frame and the skin through the inlay, and wherein the at least an area surrounding the opening is fully embedded in the skin.

39. The airplane component of claim 38, further comprising a fastener fastening the skin to the metal frame at the inlay, wherein the fastener engages the inlay such that when the structural load is applied, the structural load is transferred through the inlay and fastener.

40. The airplane component of claim 39, wherein the fastener comprises a countersunk rivet with a beveled head, wherein the fastener extends through an aligned opening in each of the metal frame, skin and inlay, and wherein the opening of the inlay is shaped to correspond to the beveled head.

41. A method of building an airplane component, comprising steps of:
adapting a composite material airplane skin to transfer a structural load between the skin and a metal airplane frame; and
fastening the adapted composite material airplane skin to the metal airplane frame,
wherein the step of adapting comprises embedding an inlay within the composite material airplane skin, wherein the inlay is solid in at least an area surrounding an opening therein for accepting a fastener, wherein the inlay has a load bearing strength sufficiently greater than that of the composite material to enable the skin to transfer the structural load through the inlay when applied, and wherein the at least an area surrounding the opening is fully embedded in the skin.

42. The method of claim 41, wherein the step of fastening comprises fastening the adapted composite material airplane skin to the metal airplane frame with a fastener at the inlay such that when the structural load is applied, the structural load is transferred through the inlay and fastener.

* * * * *